United States Patent [19]

Schmidt, deceased et al.

[11] 3,787,794
[45] Jan. 22, 1974

[54] TOP COVER FOR A BUS DUCT JOINT

[75] Inventors: John E. Schmidt, deceased, late of Oxford, Ohio; Margaret J. Schmidt, Legal Representative, Lexington, Ky.; George N. Jorgensen, Oxford, Ohio

[73] Assignee: Square D Company, Park Ridge, Ill.; by said Jorgensen

[22] Filed: Jan. 12, 1973

[21] Appl. No.: 322,999

[52] U.S. Cl. ............. 339/22 B, 339/36, 24/248 SL, 24/259 B, 174/66, 174/68 B, 160/217, 160/230
[51] Int. Cl. ........................................... H01r 13/60
[58] Field of Search... 339/22 B, 36, 37; 24/248 SL, 24/248 D, 113 R, 252 B, 259 B; 248/226 R; 220/24 R, 24 B; 174/66, 68 B; 160/230, 215–217, 224–228

[56] References Cited
UNITED STATES PATENTS

| | | | |
|---|---|---|---|
| 918,160 | 4/1909 | Johnson | 24/248 D |
| 145,074 | 12/1873 | Treat | 24/248 |
| 2,134,224 | 10/1938 | Brown | 24/248 HE |
| 3,609,215 | 9/1971 | Giger et al. | 174/88 B |
| 1,474,675 | 11/1923 | Kirkness | 160/230 |

FOREIGN PATENTS OR APPLICATIONS

| | | | |
|---|---|---|---|
| 66,644 | 4/1948 | Denmark | 160/215 |

*Primary Examiner*—Marvin A. Champion
*Assistant Examiner*—Robert A. Hafer
*Attorney, Agent, or Firm*—Harold J. Rathbun et al.

[57] ABSTRACT

A two-part hinged cover is inserted between the opposite flanges of the tops of a pair of connected bus duct sections at the joint therebetween and straightened to abut their top surfaces. The cover is locked in the straightened position by a pair of screws. A gasket secured to the cover forms a seal between the top surfaces of the bus duct sections and the cover.

3 Claims, 5 Drawing Figures

PATENTED JAN 22 1974  3,787,794
FIG. 1
FIG. 5
FIG. 2
FIG. 3
FIG. 4
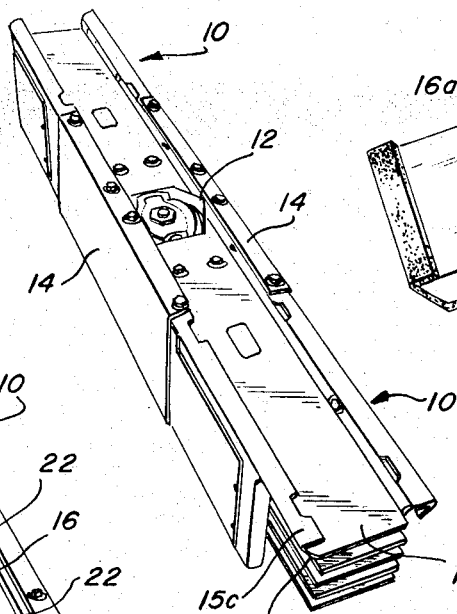
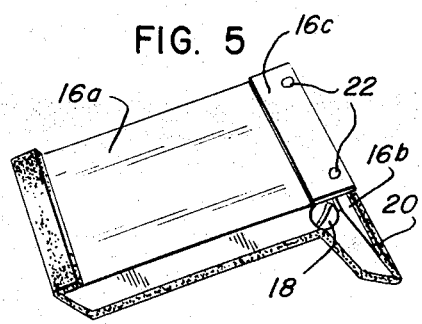
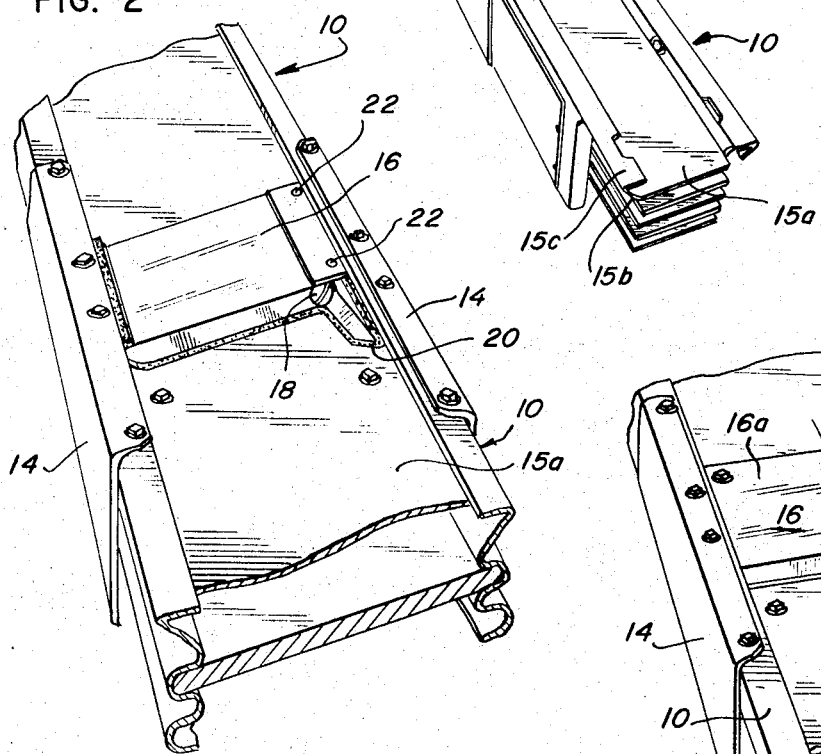
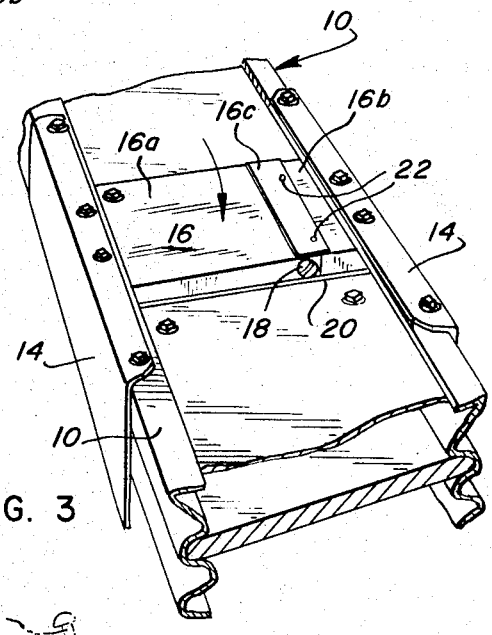
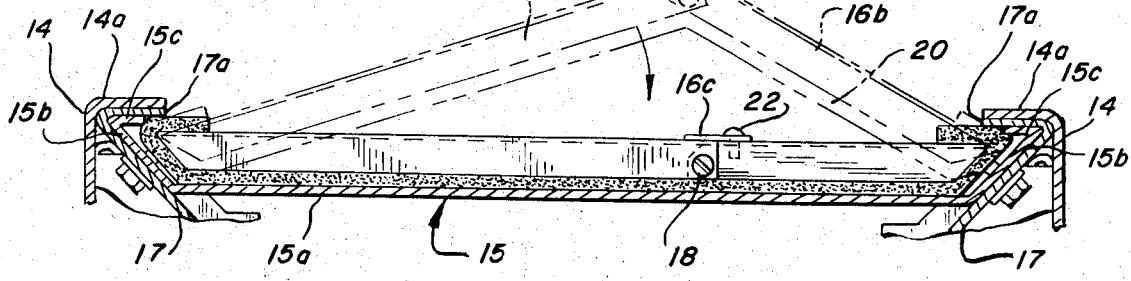

TOP COVER FOR A BUS DUCT JOINT

This invention relates generally to plug-in bus duct, and more particularly to a top cover for an opening defined by the bus duct housings at the joint between connected sections of plug-in bus duct.

An object of the invention is to provide a protective top cover for sealing an opening defined by the bus duct housings at the joint between connected sections of bus duct.

A further object is to provide a hinged joint cover which may be straightened to fit between opposite flanges of the housings of connected bus duct sections.

Other objects and advantes will appear when the following specification is considered along with the accompanying drawings.

FIG. 1 is a perspective view of two connected sections of bus duct showing an opening in the top wall of the composite housing of the two bus duct sections at the joint therebetween;

FIG. 2 is a fragmentary perspective view of the two connected bus duct sections of FIG. 1 and showing a two-part hinged top cover, constructed in accordance with this invention, in place over the opening in a partially installed position;

FIG. 3 is a view similar to FIG. 2, but showing the hinged top cover in a fully installed position;

FIG. 4 is a fragmentary sectional view through one of the bus duct sections looking at the installed cover and showing the partially installed position of the cover in broken lines; and FIG. 5 is a perspective view of the two-part hinged cover of FIGS. 2 to 4.

With reference to the drawings, FIG. 1 shows a pair of connected bus duct sections 10 each similar to that disclosed in FIGS. 1–5 of U.S. Pat. No. 3,384,855, issued may 21, 1968. The ends of the top and bottom wall portions of the housings of the bus duct sections 10 are so shaped as to provide openings at the joint such as an opening 12 shown in the top wall portion of the connected bus duct sections. A pair of side tie channels 14 are provided to secure the two sections of bus duct 10 together longitudinally.

As best shown in FIG. 4, each bus duct section 10 has a top wall portion 15 including a main portion 15a extending horizontally in the installed position of the bus duct, a pair of opposite flange portions 15b respectively extending upwardly and outwardly substantially at 45° angles from opposite edge portions of the main portion 15a, and a pair of edge portions 15c extending inwardly toward each other respectively from the flange portions 15b substantially parallel to the main portion 15a.

As shown in FIG. 2, a two-part hinged top cover 16 is placed over the opening 12 between the bus duct sections 10. The cover 16 comprises a pair of flanges plates 16a and 16b pivotally connected at overlapping flange portions respectively on opposite sides by a pair of screws 18, only one of which is shown. A flexible gasket 20 is adhesively secured to the edges of the flange portions of the plates 16a and 16b and to the upper surfaces of the outer end portions of the plates on opposite sides of the pivotal axis defined by the screws 18.

As shown in FIG. 4, the opposite outer end portions of the plates 16a and 16b are received respectively beneath the edge portions 15c of the top wall portions 15 of the connected bus duct sections 10, beneath adjacent flange portions 14a of the tie channels 14, and beneath corresponding edge portions 17a of opposite side wall portions 17 of the bus duct sections 10. When the cover 16 is first placed over the opening 12, the plates 16a and 16b thereof are disposed angularly from the main portions 15a of the top wall portions 15. The plates are then straightened by the installer, pivoting about the screws 18. A pair of screws 22 are then inserted respectively through appropriate openings in an extension 16c of the plate 16a and threaded respectively into a pair of threaded openings in the plate 16b to lock the cover 16 in the straightened position shown in FIG. 3. In the straightened position the gasket 20 is in abutting relationship with the upper surfaces of the top wall portions 15 of the bus duct sections 10 and effectively seals the opening 12.

We claim:

1. A cover for sealing an opening defined by the upper wall portions of the housings of a pair of connected bus duct sections, said cover comprising a pair of pivotally connected plate members, one of said plate members having an extension overlapping a portion of the other of said plate members when the plate members are in a straightened position, locking means for locking the plate members in straightened position, and a flexible gasket adhesively secured to said plate members and coextensive therewith.

2. A cover as claimed in claim 1 wherein said extension has an aperture therethrough, said other plate member has a threaded aperture aligned with the aperture in said extension, and a screw is insertable through the aperture in said extension and threadable into the aperture in said other plate member to provide said locking means.

3. A top cover for use in closing an opening defined by upper wall portions of the housings of a pair of connected bus duct sections, the upper wall portions of the housings of each of the bus duct sections including a main portion, a pair of opposite side flange portions extending outwardly and upwardly from the main portion, and a pair of edge portions extending inwardly toward each other from the flange portions, said top cover comprising a pair of pivotally connected plate members, one of said plate members having an extension overlapping a portion of the other of said plate members when the plate members are in a straightneed position, locking means for locking the plate members in a straightened position, and a flexible gasket adhesively secured to the plate members and coextensive therewith, respective outer end portions of the plate members of the cover insertable between the edge portions of the top wall portions of the connected bus duct sections when the plate members are angularly disposed with respect to each other, the plate members being receivable beneath the edge portions of the top wall portions of the connected bus duct sections when the plate members are pivoted to a straightened position wherein the gasket is in abutting relationship with the respective top wall portions and flange portions of connected bus duct sections, and securable in the straightened position by said locking means.

* * * * *